United States Patent
Boczek et al.

(10) Patent No.: US 9,611,804 B2
(45) Date of Patent: Apr. 4, 2017

(54) METHOD FOR PRODUCING A PISTON

(71) Applicant: MAHLE International GmbH, Stuttgart (DE)

(72) Inventors: Sascha-Oliver Boczek, Dielheim (DE); Ulrich Bischofberger, Esslingen (DE); Rainer Scharp, Vaihingen (DE)

(73) Assignee: MAHLE International GmbH, Stuttgart (DE)

( * ) Notice: Subject to any disclaimer, the term of this patent is extended or adjusted under 35 U.S.C. 154(b) by 159 days.

(21) Appl. No.: 14/415,194

(22) PCT Filed: Jul. 18, 2013

(86) PCT No.: PCT/DE2013/000404
§ 371 (c)(1),
(2) Date: Feb. 6, 2015

(87) PCT Pub. No.: WO2014/012531
PCT Pub. Date: Jan. 23, 2014

(65) Prior Publication Data
US 2015/0176523 A1   Jun. 25, 2015

(30) Foreign Application Priority Data
Jul. 18, 2012  (DE) .................. 10 2012 014 194

(51) Int. Cl.
*F02F 3/00* (2006.01)
*B23P 15/10* (2006.01)
*F02F 3/18* (2006.01)

(52) U.S. Cl.
CPC ............ *F02F 3/0092* (2013.01); *B23P 15/10* (2013.01); *F02F 3/003* (2013.01); *F02F 3/18* (2013.01);

(Continued)

(58) Field of Classification Search
CPC ... B23P 15/10; F02F 3/003; F02F 3/18; F02F 3/0092; F02F 2003/0061;
(Continued)

(56) References Cited

U.S. PATENT DOCUMENTS 1,841,796 A    1/1932  Edwards
1,878,566 A    9/1932  Woolson
(Continued)

FOREIGN PATENT DOCUMENTS

DE           1576733 A1 *  3/1971  .......... F02B 23/0675
DE    10 2011 114 105 A1   6/2012
(Continued)

OTHER PUBLICATIONS

Machine Translation of JP-62096762.*
(Continued)

*Primary Examiner* — Jacob Cigna
(74) *Attorney, Agent, or Firm* — Collard & Roe, P.C.

(57) ABSTRACT

The invention relates to a method for producing a piston (1) for an internal combustion engine, characterized by the following method steps: producing an upper piston part (2) and a lower piston part (3) having one or more recesses (4, 4') for forming a closed cavity (5); introducing a heat transfer medium (6), in particular one or more alkali metals, that is solid or paste-like at ambient temperature and liquid at the intended operating temperature of the piston, into the recesses (4, 4') of the lower piston part (3) and/or of the upper piston part (2), wherein the heat transfer medium (6) is provided in order, during the operative state of the piston (1), to effect heat transport within the piston (1) by convection; closing the recesses to form the closed cavity (5) which encloses the heat transfer medium (6); and connecting the upper piston part (2) to the lower piston part (3). This enables the piston (1) to be produced in a simplified manner.

6 Claims, 1 Drawing Sheet

Figure 1:
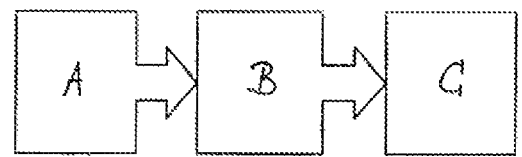

(52) U.S. Cl.
CPC ............... *F02F 2003/0061* (2013.01); *F05C 2201/0448* (2013.01); *Y10T 29/49252* (2015.01)

(58) Field of Classification Search
CPC ................ F02F 3/0015; F02F 3/0084; F05C 2201/0448; Y10T 29/49252
See application file for complete search history.

(56) References Cited

U.S. PATENT DOCUMENTS

| | | | | |
|---|---|---|---|---|
| 3,609,840 | A | * | 10/1971 | Canady ............... F02F 3/18 228/114.5 |
| 3,914,574 | A | * | 10/1975 | Hill ............... B23P 15/10 219/121.14 |
| 5,309,818 | A | * | 5/1994 | Mendes ............... B23P 15/10 123/193.6 |
| 8,899,208 | B2 | | 12/2014 | Bischofberger |
| 2005/0087153 | A1 | | 4/2005 | Moon |
| 2013/0032103 | A1 | * | 2/2013 | Azevedo ............... F02F 3/22 123/41.35 |
| 2013/0047948 | A1 | | 2/2013 | Heuschmann |

FOREIGN PATENT DOCUMENTS

| | | | | |
|---|---|---|---|---|
| DE | WO 2012079566 | A2 | * 6/2012 | ............... F02F 3/18 |
| DE | 10 2011 111 319 | A1 | 2/2013 | |
| FR | 880 033 | A | 3/1943 | |
| FR | 987 818 | A | 8/1951 | |
| JP | 62096762 | A | * 5/1987 | |
| WO | 2012/079566 | A2 | 6/2012 | |
| WO | 2013/029592 | A1 | 3/2013 | |
| WO | 2013/156442 | A1 | 10/2013 | |

OTHER PUBLICATIONS

International Search Report of PCT/DE2013/000404, mailed Nov. 18, 2013.
German Search Report in German Application No. 10 2012 014 194.7, dated May 21, 2013, with English translation of the relevant parts.

* cited by examiner

METHOD FOR PRODUCING A PISTON

CROSS REFERENCE TO RELATED APPLICATIONS

This application is the National Stage of PCT/DE2013/000404 filed on Jul. 18, 2013, which claims priority under 35 U.S.C. §119 of German Application No. 10 2012 014 194.7 filed on Jul. 18, 2012, the disclosures of which are incorporated by reference. The international application under PCT article 21(2) was not published in English.

The present invention relates to a method for the production of a piston for an internal combustion engine, in accordance with the preamble of claim 1. The invention furthermore relates to a piston produced according to this method, as well as to an internal combustion engine having at least one such piston.

Modern internal combustion engines are subject to great stress with regard to their pistons, so that these must usually be actively cooled. Such active cooling for reducing the surface temperatures can particularly be achieved by means of motor oil continuously introduced into cooling channels, which carries away heat as it flows back into the oil circuit. In the case of diesel engines, in particular, steel pistons are frequently used, whereby the maximally tolerated temperatures of the cooling oil are exceeded because of the high temperatures in the combustion chamber, thereby then bringing about premature degeneration or coking of the cooling oil. The consequences of this are an accumulation of oil carbon on the mantle surface of the cooling channel, with the further known effects on the piston, such as the buildup of an insulation layer, for example, and a further increase in the temperature of the piston. However, high temperatures of the oil bring about premature oil aging and, accompanying this, comparatively short oil replacement intervals.

Known steel pistons are usually produced from an upper piston part and a lower piston part connected with it, for example by way of a friction-welded connection. In this connection, the upper piston part and the lower piston part, in the joined state, enclose a circumferential cooling channel that has an injection opening and a drain opening for motor oil on its underside, facing away from the piston crown, which oil carries heat away from the piston.

In order to allow heat dissipation at higher temperatures than the motor oil can tolerate, pistons have been created that contain a sodium/potassium alloy in a completely closed cavity, which alloy carries away heat from the piston crown during operation, by means of convection. In a second stage, the heat is conducted away into the oil circuit, for example by means of spraying further piston regions, farther away from the piston crown and no longer so hot, in known manner.

To fill the alloy into the closed cavity, a filling opening must be created after the fact, but this must subsequently be closed again and later checked to ascertain tightness, in order to prevent exiting of the highly reactive metals. Additional processing steps result from this, such as, for example, drilling of the filling opening, as do additional parts, such as, for example, external closure plugs, both of which contributes to increasing the production costs for such a piston. In this connection, it is of particular importance that the piston requires particularly careful handling during filling, because the piston has already been finish-machined and is therefore extremely susceptible to damage.

The present invention therefore concerns itself with the problem of indicating an improved embodiment for a method of the stated type, for the production of a piston, which embodiment particularly allows simplified and, at the same time, efficient production of pistons.

This problem is solved, according to the invention, by means of the objects of the independent claims. Advantageous embodiments are the object of the dependent claims.

The present invention is based on the general idea of introducing a heat transfer medium for convective cooling of a piston, in the solid state, even before the upper piston part is actually connected with the lower piston part, into at least one depression in at least one of the two parts. Subsequently, the heat transfer medium is enclosed in at least one closed cavity, which is formed in the lower piston part and/or the upper piston part, before or while the two parts are connected with one another. In a preferred embodiment, the closed cavity is disposed between the two parts, wherein closing of the cavity takes place by means of the actual process of connecting the upper piston part with the lower piston part. As a result, subsequent drilling into the cavity and filling in liquid heat transfer medium and closing off the cavity can be eliminated. In the method according to the invention for the production of a piston for an internal combustion engine, therefore, in a first step, an upper piston part and a lower piston part are produced, wherein each of the two parts, but at least one of the two, preferably the lower piston part, possesses depressions for forming a closed cavity. Subsequently, introduction of a heat transfer medium that is solid or paste-like at room temperature, but liquid at the operating temperature of the piston, particularly a metal alloy, into the depressions of the lower piston part and/or the upper piston part takes place, wherein the heat transfer medium only liquefies later, in the operating state of the piston, in other words at clear elevated temperatures, and carries away the heat, by means of convection, particularly from the piston crown into other regions. There, the heat can be conducted away into the oil circuit, by means of piston cooling methods known in the technical field, such as spraying motor oil directly onto the piston, for example, or by means of a an open cooling channel continuously supplied with motor oil. After introduction of the heat transfer medium that is solid or paste-like at room temperature into the depressions of the lower piston part and/or the upper piston part, closing of the depressions that contain the heat transfer medium takes place, to form the at least one closed cavity, and connection of the upper piston part with the lower piston part takes place.

The step of closing can take place as a separate step, for example by means of the insertion of a separation element, such as a separation plate, for example, into a depression, for separating the close cavity, even before the step of connecting the upper piston part with the lower piston part takes place. The separation plate can lie against the walls of the depression, forming a seal, under bending bias, and can advantageously support itself on projections, in order to find a secure hold under the accelerations that are in effect and to securely enclose the heat transfer medium. Alternatively or additionally, it can be welded, soldered or glued onto the wall. In another preferred embodiment, the closed cavity can occur only during the process of connecting the upper piston part with the lower piston part, between them, for example as an interstice between two circumferential concentric friction-weld seams.

After the two piston parts have been connected, for example by means of a friction-weld connection, the heat transfer medium that is paste-like or solid at room temperature is already enclosed in the cavity, which is closed off all around, whereby liquefaction of the heat transfer medium and thereby also the possibility of cooling the piston by means of the heat transfer medium sloshing back and forth in the cavity occurs only during operation of the internal combustion engine or, for example, also by means of prior heating of the piston. In this connection, the heat transfer medium can assume a solid state again after cooling of the piston, for example after the internal combustion engine is shut off, or can remain in a liquid state, so that the heat transfer medium, which was solid at first, during production of the piston, becomes liquid as the result of a temperature introduction, and subsequently also remains liquid at least almost independent of the temperature.

The latter can be achieved, in a preferred embodiment, in that the heat transfer medium contains two or more elements, such as, for example, alkali metals, preferably sodium and potassium, which are introduced into one or more depressions in entirely or partially de-mixed form, and are present in a solid or paste-like state at the processing temperature or room temperature. Only afterward are the depressions closed to form one or more closed cavities, and the upper and lower part of the piston are connected, for example by means of friction welding.

With the method according to the invention, the expensive other processing steps that were previously required are eliminated, in particular, such as, for example, subsequent drilling into the closed cavity, filling the heat transfer medium into the cavity through the drilled filling opening, and closing the filling opening, as well as a later check of the tightness of this closure. With the method according to the invention, it is therefore possible to produce the piston in clearly simpler and more efficient and economical manner, because not only can the aforementioned work steps be eliminated, but also a closure element, which was previously required, is no longer needed.

In an advantageous further development of the solution according to the invention, a heat transfer medium having only a single suitable chemical element, preferably an alkali metal, particularly with sodium, is used. Sodium has a melting point of approximately 98° C., for example, so that a transition from the solid form to the liquid form does not take place until approximately 98° C. Below this temperature, sodium is solid, so that it would resume a solid state during extended shutdown times of the internal combustion engine, for example. During operation of the internal combustion engine, the piston heats up with an increasing period of operation, wherein the sodium enclosed in the cavity becomes liquid starting from a temperature of approximately 98° C., and can bring about effective heat removal from the piston crown, before the piston becomes too hot.

In an advantageous further development of the solution according to the invention, a heat transfer medium having at least two different alloy elements, particularly sodium and potassium, is used. In this connection, these two alloy elements are at first introduced, spatially separated, into the depression(s) of the cooling channel in the lower piston part and/or the upper piston part, in an entirely or partially de-mixed or separated state, i.e. as elements or in different alloys that have different compositions and are solid at room temperature, whereupon only then does closing of the depression(s) to form the closed cavity, as well as connecting the upper piston part with the lower piston part take place. Potassium possesses a melting temperature of 63° C., whereas sodium possesses a melting temperature of approximately 98° C. Therefore the two elements are solid, in the separate state, up to about 60° C. In contrast, the melting point of a sodium/potassium alloy (NaK) as well as the melting point of alloys of other metals, in general, is lower than the melting points of the individual elements, and reaches its minimum in the eutectic, in this example with NaK at −12.6° C. with 22% Na. In general, the NaK alloy is liquid in a broad range of mixture ratios, namely, for example, at 20° C. with about 10-60% Na, while other mixture ratios and the two pure elements are present in solid form. In an advantageous embodiment, the melting point of the alloy during operation can be lowered below room temperature by means of mixing two substances that are at first spatially separated.

When the piston produced according to the invention is now put into operation in the internal combustion engine, its temperature rises, whereby the de-mixed individual components of the coolant become liquid above their melting points, and thereby irreversibly mix with the other components. The mixture of sodium and potassium that occurs as a result possesses a lower melting point than the solids originally introduced, so that the heat transfer medium, once it has been mixed, always remains liquid at room temperature even after the internal combustion engine has been shut off. Such a heat transfer medium containing sodium/potassium possesses great heat transfer capacity and consist, for example, of 40-90 wt.-% potassium and the remainder sodium, particularly of 22% sodium and 78% potassium. Of course, a plurality of elements or their alloys can be used in many different mixture ratios, which are solid at room temperature, as such, but melt at operating temperature and, after having been completely mixed together, preferably remain liquid even at room temperature. Cesium, for example, can also be added to the sodium and potassium, whereby a Na—K—Cs alloy that then results has an even lower melting point of as low as −78° C.

In another advantageous embodiment of the solution according to the invention, a Galinstan® alloy having the alloy elements gallium, indium, and tin, which are separated at first, is used as the coolant. Such a Galinstan® alloys are usually liquid at room temperature and consist, for example, of 65-95 wt.-% gallium, 5-26 wt.-% indium, and 0.16 wt.-% tin. Preferred alloys are those, for example, having 68-69 wt.-% gallium, 21-22 wt.-% indium, and 9.5-10.5 wt.-% tin. Such an alloy would have a melting temperature of −19° C., for example. Alternatively, a Galinstan® alloy with 62 wt.-% gallium, 22 wt.-% indium, and 16 wt.-% tin is also conceivable, which then possesses a melting temperature of 10.7° C. Also conceivable is an alloy with 59.6 wt.-% gallium, 26 wt.-% indium, and 14.4 wt.-% tin, in other words what is called a ternary eutectic having a melting temperature of 11° C.

Bismuth alloys having a low melting point can also be used, which include, for example, LBE (eutectic bismuth-lead alloy, having a melting point of 124° C.). Furthermore, the following belong to the bismuth alloys having a low melting point: Rose's metal, with 50 wt.-% bismuth, 28 wt.-% lead, and 22 wt.-% tin, and a melting temperature of 98° C., Orion metal with 42 wt.-% bismuth, 42 wt.-% lead, and 16 wt.-% tin, and a melting point of 108° C., quick solder with 52 wt.-% bismuth, 32 wt.-% lead, and 16 wt.-% tin, and a melting point of 96° C., d'Arcet's metal with 50 wt.-% bismuth, 25 wt.-% lead, and 25 wt.-% tin, Wood's metal with 50 wt.-% bismuth, 25 wt.-% lead, 12.5 wt.-% tin, and 12.5 wt.-% cadmium, and a melting temperature of 71° C., Lipowitz metal with 50 wt.-% bismuth, 27 wt.-% lead, 13 wt.-% tin, and 10 wt.-% cadmium, and a melting temperature of 70° C., Harper's metal with 44 wt.-% bismuth, 25 wt.-% lead, 25 wt.-% tin, and 6 wt.-% cadmium, and a melting temperature of 75° C., Cerrolow 117 with 44.7 wt.-% bismuth, 22.6 wt.-% lead, 19.1 wt.-% indium, 8.3 wt.-% tin, and 5.3 wt.-% cadmium, and a melting point 47°

C., Cerrolow 174 with 57 wt.-% bismuth, 26 wt.-% indium, 17 wt.-% tin, and a melting point of 78.9° C., Field's metal with 32 wt.-% bismuth, 51 wt.-% indium, 17 wt.-% tin, and a melting point of 62° C., as well as Walker's alloy with 45 wt.-% bismuth, 28 wt.-% lead, 22 wt.-% tin, and 5 wt.-% antimony.

It is practical if the cavity is filled with the heat transfer medium by only about 5% to about 33%, preferably by 10-15%. It is also conceivable that the volume of the heat transfer medium accommodated in the cavity amounts to at most 10% of the volume of the cavity, which offers the great advantage that the heat transfer medium is subject to what is called the Shaker effect during engine operation, whereby it is moved counter to the stroke direction of the piston in the cavity. During the downward stroke of the piston, the heat transfer medium is therefore moved in the direction of the piston crown and can absorb heat, whereas during the upward stroke of the piston, the heat transfer medium is moved in the direction of the piston skirt and thereby can conduct away the heat it has absorbed, in the direction of the piston skirt, thereby improving the cooling effect.

Further important characteristics and advantages of the invention are evident from the dependent claims, from the drawings, and from the related figure description using the drawings.

It is understood that the characteristics mentioned above and still to be explained below can be used not only in the combination indicated, in each instance, but also in other combinations or standing alone, without departing from the scope of the present invention.

Preferred exemplary embodiments of the invention are shown in the drawing and will be explained in greater detail in the following description, whereby the same reference symbols refer to the same or similar or functionally equivalent components.

Figure 2:
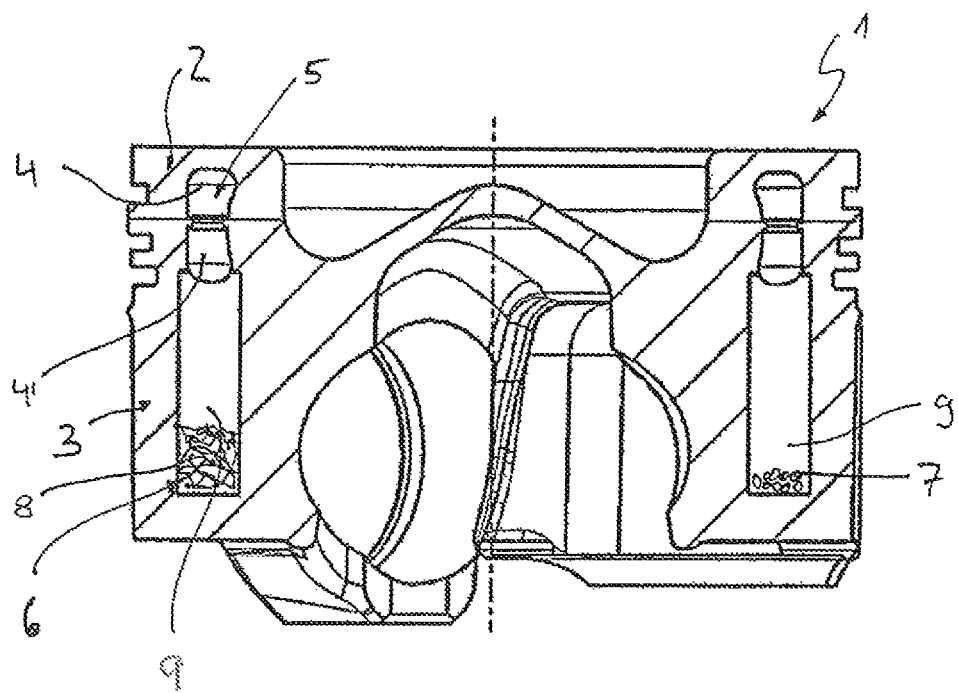

In this connection, the figures show, schematically in each instance:

FIG. 1 a possible schematized sequence of a method according to the invention for the production of a piston, FIG. 2 different sectional representations through the piston produced according to the invention.

In accordance with FIG. 1, a method according to the invention for production of a piston 1 (compare FIG. 2) has at least three method steps A, B, and C. In method step A, first an upper piston part 2 and a lower piston part 3 are produced, each having a depression 4, 4' for forming a common, closed cavity that lies between them. The closed cavity 5 comprises a ring channel similar to the known cooling channels supplied with motor oil, which channel runs concentric to the piston axis and is formed by the depressions 4, 4', but it does not have any inlet opening or outlet opening.

Of course, in this connection, it is also conceivable of course that a depression 4, 4' is provided exclusively in the upper piston part 2 or in the lower piston part 3. In method step B, a heat transfer medium 6, particularly a metal alloy, which is solid or paste-like at room temperature, is subsequently introduced into the depressions 4' of the lower piston part 3 and/or into the depressions 4 of the upper piston part 2, whereby the introduction of the heat transfer medium 6 usually takes place exclusively into the depressions 4' of the lower piston part 3. In this connection, the heat transfer medium 6 is configured in such a manner that it only liquefies in the operating state of the piston 1, in other words clearly at a temperature elevated as compared with room temperature, and thereby develops the Shaker effect that cools the piston 1. In method step C, subsequently, the upper piston part 2 is firmly connected with the lower piston part 3, and thereby the closed ring channel 5 is produced. Connecting the upper piston part 2 with the lower piston part 3 can take place, for example, by means of friction welding or by means of gluing or soldering. If the depression 4' is comparatively flat, undesirable liquefaction of the heat transfer medium 6 could already occur during welding of the two parts 2, 3.

If one considers FIG. 2, one can see that the depressions 4, 4' together form the circumferential ring channel, whereby the depression 4' furthermore has elongated recesses 9 that extend in the axial direction in the lower piston part 3 and proceed from the ring channel in the manner of table legs, and thereby are configured to be comparatively deep, in part. If, in this connection, the heat transfer medium 6, which is solid or paste-like at room temperature, is filled into such a "table leg" recess 9, then the heat that occurs during welding of the upper piston part 2 to the lower piston part 3 usually is not sufficient to liquefy the heat transfer medium. After the upper piston part 2 has been connected with the lower piston part 3, finish-machining of the piston 1 takes place. The piston 1 is usually formed from steel.

In general, the heat transfer medium 6 can have only a single element, for example sodium 7, whereby the sodium 7 only becomes liquid during operation of the piston 1 and after the melting temperature has been exceeded. Alternatively, it is also conceivable that the heat transfer medium 6 has at least two alloy elements, for example sodium 7 and potassium 8, whereby the two alloy elements 7, 8 are filled into different recesses 9 in the lower piston part 3. Alternately, however, they can also be disposed spatially separated, for example disposed one on top of the other in the same recess 9 or in regions of the ring channel formed by the depressions 4, 4'. During operation of the piston 1, its temperature increases, whereby when the melting temperature of potassium 8 is exceeded, in other words when 63° C. is exceeded, it liquefies and then mixes with the sodium 7, thereby causing a sodium/potassium alloy to form, which possesses a melting temperature below room temperature in the case of a suitable mixture ratio, for example of −11° C., so that this alloy mixture does not necessarily solidify again after the piston 1 has cooled off. When a eutectic sodium/potassium alloy with 22% sodium and 78% potassium is produced, the melting point actually drops to −12.6° C. Of course, other mixture ratios and/or other alloy elements, such as cesium, for example, which are solid or in paste-like form at room temperature, can also be introduced into the respective depressions 4' of the lower piston part 3 and/or into the related depressions 4 of the upper piston part 2, whereby a sodium/potassium/cesium alloy with 12% sodium, 47 wt.-% potassium, and 41 wt.-% cesium possesses a melting point of −78° C.

Further advantageous alloys are, for example, Galinstan® alloys with the alloy elements gallium, indium, and tin, which are filled in separately, at first, as well as bismuth alloys having a low melting point.

In this connection, the amount of the heat transfer medium 6 accommodated in the closed cavity 5 depends on its heat conductivity and the degree of the desired temperature control. Preferably, the volume of the heat transfer medium 6 accommodated in the cavity 5 amounts to at most 10% or 10-15% of the volume of the cavity, which offers the great advantage that the heat transfer medium 6 is subject to what is called the Shaker effect during engine operation, whereby it is moved counter to the stroke direction of the piston 1 in the cavity 5. During the downward stroke of the piston 1, the heat transfer medium 6 is moved in the direction of the piston crown and can absorb heat, whereas during the upward stroke of the piston 1, it is moved in the direction of the piston skirt and thereby can conduct away the heat it has absorbed, in the direction of the piston skirt.

With the method according to the invention for simplified and efficient production of the piston 1, it is possible to achieve at least the following advantages. First of all, subsequent drilling into the cavity 5 and filling in heat transfer medium 6 as well as subsequently closing off the cavity 5 can be eliminated, thereby not only making it possible to eliminate a significant number of processing steps, but furthermore to also guarantee the tightness of the cavity 5 containing the heat transfer medium in the long term, because undesirable opening of the closure on the filling opening no longer occurs. Likewise, the parts that close off the filling opening, such as closure plugs, for example, are also eliminated, thereby making it possible to reduce the production costs and also the storage and logistics costs. Furthermore, careful handling of the piston 1 when filling the cavity 5 with heat transfer medium 6 is also no longer required, because finish-machining of the piston 1 takes place only after filling, not before, as it did previously.

The invention claimed is:

1. Method for the production of a piston (1) for an internal combustion engine, comprising the following method steps:
   producing an upper piston part (2) and a lower piston part (3), wherein the upper piston part (2) and/or the lower piston part (3) has/have at least one depression (4, 4'),
   introducing a heat transfer medium (6) that is solid or a paste at room temperature and liquid at the operating temperature of the piston into at least one of the depressions (4, 4'),
   closing the at least one depression (4, 4'), with the formation of at least one closed cavity (5), which contains the heat transfer medium (6), and
   connecting the upper piston part (2) with the lower piston part (3),
   wherein said heat transfer medium is composed of at least two alloy elements that are introduced, in differing composition, into at least two spatially separated regions of the at least one depression (4, 4') of the lower piston part (3) and/or of the upper piston part (2), and are enclosed together within the at least one closed cavity (5) during the step of closing.

2. Method according to claim 1, wherein closing of the at least one depression (4, 4') takes place when connecting the upper piston part (2) with the lower piston part (3), wherein the closed cavity (5) is disposed between the upper piston part (2) and the lower piston part (3).

3. Method according to claim 1, wherein closing of the at least one depression (4, 4') takes place by means of insertion of a separation element into the depression (4, 4'), before the upper piston part (2) is connected with the lower piston part (3).

4. Method according to claim 1, wherein the heat transfer alloy comprises:
   a coolant (6) having two or more alkali metals (7, 8) as the alloy elements, or
   a Galinstan® alloy with gallium, indium, and tin, or
   a bismuth alloy.

5. Method according to claim 1, wherein the piston (1) is finish-machined after the upper piston part (2) is connected with the lower piston part (3).

6. Method according to claim 1, wherein the at least two alloy elements comprise sodium and potassium.

* * * * *